(12) United States Patent
Li et al.

(10) Patent No.: US 12,476,761 B2
(45) Date of Patent: Nov. 18, 2025

(54) METHODS AND APPARATUSES FOR RESOURCE CONFIGURATION

(71) Applicant: Lenovo (Beijing) Ltd., Beijing (CN)

(72) Inventors: Yingying Li, Haidian District (CN); Zhi Yan, Xicheng District (CN); Hongmei Liu, Changping District (CN); Yuantao Zhang, Dongcheng District (CN); Haiming Wang, Xicheng District (CN)

(73) Assignee: Lenovo (Beijing) Ltd., Beijing (CN)

( * ) Notice: Subject to any disclaimer, the term of this patent is extended or adjusted under 35 U.S.C. 154(b) by 307 days.

(21) Appl. No.: 18/002,948

(22) PCT Filed: Jun. 23, 2020

(86) PCT No.: PCT/CN2020/097825
§ 371 (c)(1),
(2) Date: Dec. 22, 2022

(87) PCT Pub. No.: WO2021/258311
PCT Pub. Date: Dec. 30, 2021

(65) Prior Publication Data
US 2023/0246780 A1      Aug. 3, 2023

(51) Int. Cl.
*H04L 5/00*      (2006.01)
(52) U.S. Cl.
CPC .................... *H04L 5/0051* (2013.01)
(58) Field of Classification Search
None
See application file for complete search history.

(56) References Cited

U.S. PATENT DOCUMENTS

| | | | |
|---|---|---|---|
| 2019/0075014 A1 | 3/2019 | Hua et al. | |
| 2020/0100321 A1* | 3/2020 | Sengupta | H04W 76/36 |
| 2021/0185736 A1* | 6/2021 | Shi | H04W 74/004 |
| 2021/0259040 A1* | 8/2021 | Babaei | H04W 72/23 |
| 2022/0070855 A1* | 3/2022 | Zhang | H04W 72/51 |
| 2022/0104099 A1* | 3/2022 | Yang | H04L 5/0051 |
| 2022/0159734 A1* | 5/2022 | Dai | H04L 5/0053 |
| 2023/0327737 A1* | 10/2023 | Gao | H04W 56/0015 370/329 |

FOREIGN PATENT DOCUMENTS

| | | |
|---|---|---|
| CN | 110536434 A | 12/2019 |
| WO | 2020025060 A1 | 2/2020 |
| WO | 2020033895 A1 | 2/2020 |

OTHER PUBLICATIONS

PCT/CN2020/097825, "International Preliminary Report on Patentability", PCT Application No. PCT/CN2020/097825, Jan. 5, 2023, 6 pages.
PCT/CN2020/097825, "International Search Report and Written Opinion", PCT Application No. PCT/CN2020/097825, Mar. 8, 2021, 7 pages.

* cited by examiner

*Primary Examiner* — Otis L Thompson, Jr.
(74) *Attorney, Agent, or Firm* — FIG. 1 Patents

(57) ABSTRACT

The present disclosure relates to methods and apparatuses for resource configuration. A method includes receiving a first resource(s) configuration and a second resource(s) configuration; and determining a resource(s) for RRC idle/inactive mode by the second resource(s) configuration: wherein the second resource(s) configuration is determined based on value(s) of parameter(s) in the first resource(s) configuration and/or value(s) of additional parameter(s).

20 Claims, 10 Drawing Sheets

METHODS AND APPARATUSES FOR RESOURCE CONFIGURATION

TECHNICAL FIELD

The present application generally relates to wireless communication technology, and more particularly, to methods and apparatuses for resource configuration.

BACKGROUND

Wireless communication technology continues to grow exponentially over the years. The Next Generation Mobile Network (NGNM) board has decided to focus the further NGMN activities on defining the end-to-end requirements for 5G new radio (NR) systems. The NR is generally a set of enhancements to the Long Term Evolution (LTE) mobile standard promulgated by the 3rd Generation Partnership Project (3GPP).

Typically, for radio resource management (RRM) measurement in NR, the network equipment may determine resources for use in the measurements. Since there may exist a need for reducing the overhead and power consumption in the communication network, how to determine the resource configuration and the resources is a critical issue.

SUMMARY OF THE DISCLOSURE

In accordance with some embodiments of the present disclosure, a method is provided that includes transmitting a first resource(s) configuration and a second resource(s) configuration. The second resource(s) configuration is used for determining a resource(s) in radio resource control (RRC) idle/inactive mode, and is determined based on value(s) of parameter(s) in the first resource(s) configuration and/or value(s) of additional parameter(s).

In accordance with some embodiments of the present application, a method includes receiving a first resource(s) configuration and a second resource(s) configuration; and determining a resource(s) for RRC idle/inactive mode by the second resource(s) configuration. The second resource(s) configuration is determined based on value(s) of parameter(s) in the first resource(s) configuration and/or value(s) of additional parameter(s).

In accordance with some embodiments of the present application, a method includes starting a timer when switching to RRC idle/inactive mode, to determine whether a third resource(s) configuration in RRC idle/inactive mode is valid.

In accordance with some embodiments of the present application, a method includes receiving a DCI indicating a resource(s) used for a RRM measurement(s) in RRC idle/inactive mode.

In accordance with some embodiments of the present application, a method includes transmitting a DCI indicating a resource(s) used for a RRM measurement(s) in RRC idle/inactive mode.

In accordance with some embodiments of the present application, an apparatus includes at least one non-transitory computer-readable medium having computer executable instructions stored therein. The apparatus further includes at least one receiver. The apparatus further includes at least one transmitter. The apparatus further includes at least one processor. The processor is coupled to the at least one non-transitory computer-readable medium, the at least one receiver and the at least one transmitter. The at least one non-transitory computer-readable medium and the computer executable instructions are configured, with the at least one processor, cause the apparatus to implement the above methods.

BRIEF DESCRIPTION OF THE DRAWINGS

In order to describe the manner in which advantages and features of the disclosure can be obtained, a description of the disclosure is rendered by reference to specific embodiments thereof, which are illustrated in the appended drawings. These drawings depict only example embodiments of the disclosure and are not therefore to be considered limiting of its scope.

DETAILED DESCRIPTION

The detailed description of the appended drawings is intended as a description of preferred embodiments of the present disclosure and is not intended to represent the only form in which the present disclosure may be practiced. It should be understood that the same or equivalent functions may be accomplished by different embodiments that are intended to be encompassed within the spirit and scope of the present application.

Figure 1:
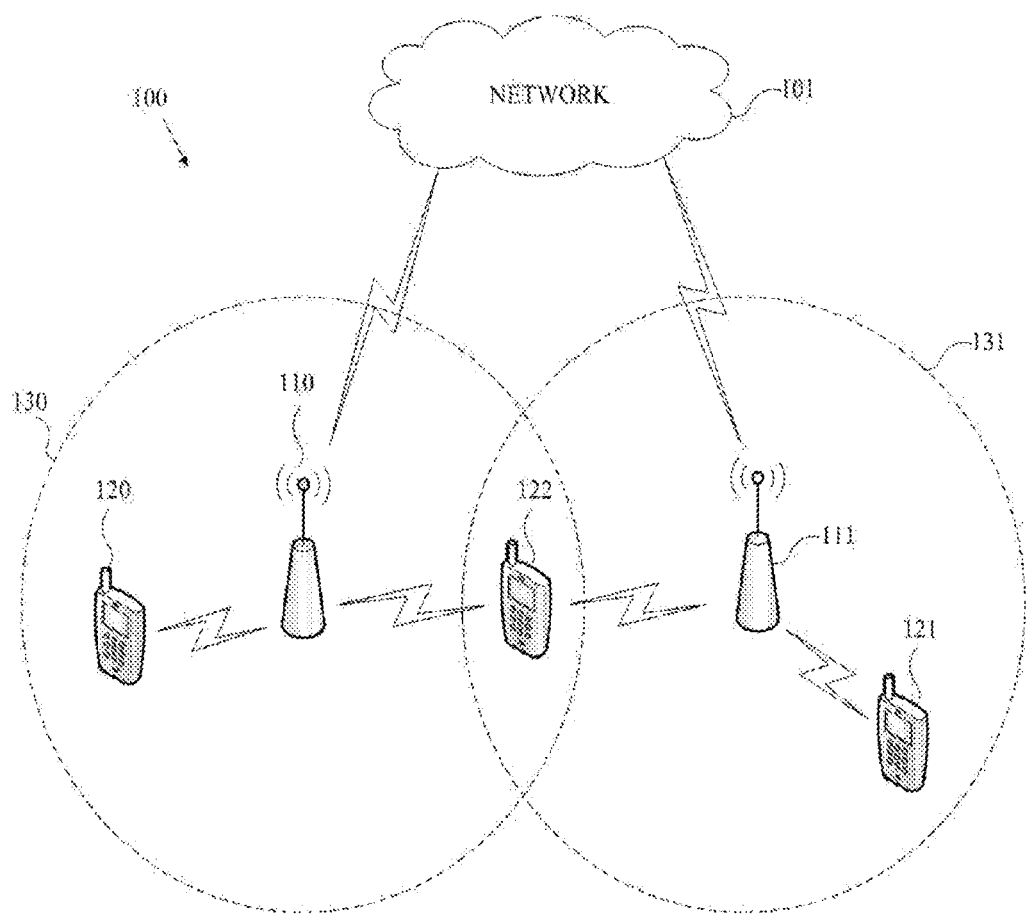
FIG. 1 illustrates an example wireless communication network in accordance with some embodiments of the present application.

FIG. 1 illustrates a wireless communication network 100 in accordance with some embodiments of the present application.

As shown in FIG. 1, the wireless communication network 100 includes a base station (BS) 110, BS 111, UE 120, UE 121, and UE 122. Although merely two BSs (e.g., BS 110 and BS 111) are illustrated in FIG. 1 for simplicity, it is contemplated that the wireless communication network 100 may include more or less BSs. Although merely three UE (e.g., UE 120, UE 121 and UE 122) are illustrated in FIG. 1 for simplicity, it is contemplated that the wireless communication network 100 may include more or less UE(s).

BS 110 may communicate with BS 111. BS 110 or BS 111 may also communicate with at least one network 101, for example, a core network.

BS 110 provides a wireless access to the network 101 for UE 120 and UE 122 within a coverage area 130. BS 111 provides a wireless access to the network 101 for UE 121 and UE 122 within a coverage area 131.

The coverage area 130 may belong to a serving cell of UE 120 and the coverage area 131 may belong to a neighbor cell of UE 120. The coverage area 131 may belong to a serving cell of UE 121 and the coverage area 130 may belong to a neighbor cell of UE 121. The coverage area 131 may belong to a serving cell of UE 122 and the coverage area 130 may belong to a neighbor cell of UE 122. It is contemplated that the coverage area 130 may belong to a serving cell of UE 122 and the coverage area 131 may belong to a neighbor cell of UE 122.

BS 110 may operate, for example but is not limited to, in accordance with Long-Term Evolution (LTE), LTE-Advanced (LTE-A), LTE-Unlicensed (LTE-U), LTE Licensed Assisted Access (LTE LAA), New Radio (NR), NR-Unlicensed (NR-U), Wi-Fi, Wireless Gigabit (WiGig), Worldwide interoperability For Microwave Access (WiMAX) or other wireless communication techniques. BS 111 may operate in a manner same or similar to BS 110. BS 111 may operate in a manner different from BS 110.

UE 120 may be, for example but is not limited to, a computing device, a wearable device, a mobile device, an Internet of Things (IoT) device, a vehicle having at least a transceiver, etc. UE 121 or UE 122 may be represented by or include a device same or similar to UE 120. In addition, UE 121 or UE 122 may include or represent a device that is different from UE 120. Persons skilled in the art should understand that as the technology develops and advances, the terminologies described in the present disclosure may change, and should not affect or limit principle and spirit in the present disclosure.

In NR network, UE may be configured to measure synchronization signal (SS) PBCH blocks (SSB) and/or channel state information (CSI) reference signal (CSI-RS) for the RRM measurement. UE may operate in RRC connected mode, in RRC idle mode, or in RRC inactive mode. In the current NR network, CSI-RS is used by UE for the RRM measurement only in connected mode. The CSI-RS resource(s) configuration for UE in RRC connected mode has been studied in 3GPP.

In RRC idle/inactive mode, UE mainly performs SSB-based RRM measurement and paging monitoring. SSB-based measurements are configured along with the SSB measurement timing configuration(s) (SMTC) configured by system information, while the occasions for paging monitoring depends upon UE ID and some parameters. In some cases, the time interval between a paging occasion (PO) and a SMTC measurement occasion is quite long, especially considering the fact that SMTC for UEs in RRC idle/inactive mode are usually configured with a longer periodicity in practical deployment. To perform both RRM measurements and paging monitoring, UE may have to keep awake between the paging occasion and the nearest SSB occasion beforehand, which will increase the overall active time and power consumption correspondingly.

As for a serving cell measurement in RRC idle/inactive mode, as described in FIG. 1, UE (for example, any of UE 120, UE 121 and UE 122) shall measure the synchronization signal reference signal receiving power (SS-RSRP) and synchronization signal reference signal receiving quality (SS-RSRQ) level of the serving cell and evaluate the cell selection criterion S defined for the serving cell at least once every M1 DRX (discontinuous reception) cycle, wherein the 3GPP specifies that:

M1=2 if SMTC periodicity (TSMTC)>20 ms and DRX cycle≤0.64 second; Otherwise M1=1.

Figure 2:
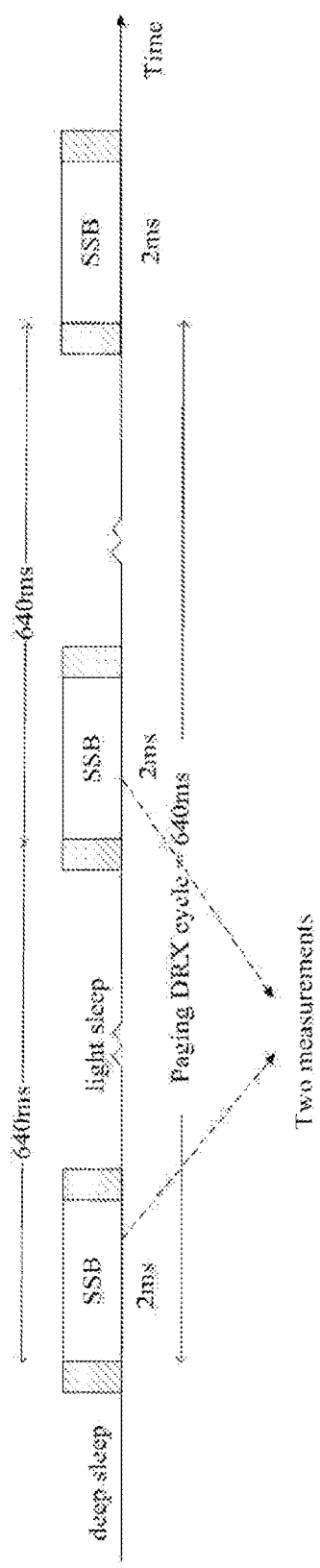
FIG. 2 illustrates an example measurement pattern in RRC idle/inactive mode in accordance with some embodiments of the present application.

Accordingly, UE should perform serving cell measurement every one or two paging DRX cycle. UE shall filter the SS-RSRP and SS-RSRQ measurements of the serving cell using at least two measurements. Within the set of measurements used for the filtering, at least two measurements shall be spaced by, at least DRX cycle/2 as shown in FIG. 2.

Great proportion of UE's power is consumed by RRM measurement, and the power consumption for RRM measurement will be even higher when neighbour cell search and measurement are also considered. Therefore, there exists a need for providing a solution of UE in RRC idle/inactive mode to reduce power consumption.

3GPP has proposed additional resource(s) for RRM measurements, which may be beneficial for saving UE's power, including at least the following aspects: (1) minimizing/reducing the timing gap between measurement (e.g., SSB) and DRX ON duration (e.g., paging monitoring occasion/reception, data reception, etc.); (2) additional resource(s) around the measurement occasion may be beneficial for automatic gain control (AGC) assistance; and (3) reducing measurement activities by providing additional resource may provide sufficient measurement/time-frequency (T-F) accuracy.

The target of additional resource(s) may include improving the measurement accuracy, as well as reducing UE's active time for RRM measurement. It is noted that the benefits mentioned above include the benefits of additional resource in case of reducing measurement activities, i.e. reducing measurement activities by providing additional resources may provide sufficient measurement and T-F accuracy.

Therefore, it is desirable to provide a solution of an additional resource(s) configuration(s) for UEs in RRC idle/inactive mode.

At the beginning, the following signals were considered as the additional resource(s) used for RRM measurement:
CSI-RS, including tracking reference signal (TRS);
wake-up signal (WUS);
modified primary synchronization signal (PSS);
standalone second synchronization signal (SSS); and
Other signals are not precluded After study and discussion, one of the objectives in the final work item (WI) is determined as follows:

"Specify enhancements for idle/inactive-mode UE power saving, considering system performance aspects [RAN2, RAN1]:
Specify means to provide potential TRS/CSI-RS occasion(s) available in connected mode to idle/inactive-mode UEs, minimizing system overhead impact [RAN1];
NOTE: Always-on TRS/CSI-RS transmission by gNodeB is not required."

TRS/CSI-RS resource(s) is determined as the additional resource(s) for RRM measurement in RRC idle/inactive mode.

Since parameters for CSI-RS are complicated, configuring a full set of parameters for each TRS/CSI-RS used for RRM measurement will increase signaling overhead, especially when the parameters are assigned by remaining minimum system information (RMSI).

Figure 3:
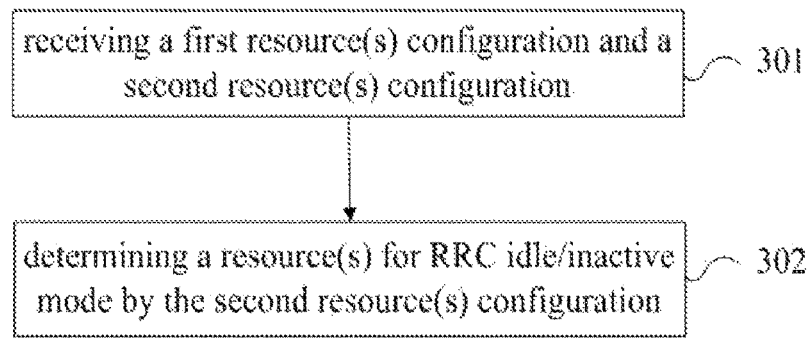
FIG. 3 illustrates a method for determining a resource(s) configuration(s) and/or a resource(s) in RRC idle/inactive mode in accordance with some embodiments of the present application.

FIG. 3 illustrates a method for determining a resource(s) configuration(s) and/or a resource(s) in RRC idle/inactive mode in accordance with some embodiments of the present disclosure. The method may be used for determining a resource(s) configuration(s) and/or a resource(s) in RRC idle/inactive mode in the wireless communication network 100 as shown in FIG. 1.

Referring to FIG. 3, in operation 301, UE may receive a first resource(s) configuration and a second resource(s) configuration.

In operation 302, UE may determine a resource(s) for RRC idle/inactive mode by the second resource(s) configuration.

In some embodiments, the first resource(s) configuration may be a CSI-RS resource(s) configuration for UE in RRC connected mode. As for the CSI-RS resource(s) configuration, UE may use a full set of value(s) of parameter(s) in the CSI-RS resource(s) configuration to determine the CSI-RS resource(s) for RRM measurement.

TABLE 1 shows a CSI-RS resource(s) configuration structure in accordance with some embodiments of the present disclosure.

TABLE 1

| CSI-RS resource(s) configuration structure |
|---|
| BWP |
| • BWP 0 |
| • BWP 1 |
| ... |
| CSI-ResourceConfig |
| • NZP-CSI-RS-ResourceSet 0 |
| ○ NZP-CSI-RS-Resource 0 |
| ■ ResourceID |
| ■ resourceMapping |
| • frequencyDomainAllocation |
| • nrofPorts |
| • firstOFDMSymbolInTimeDomain |
| • firstOFDMSymbolInTimeDomain2 |
| • cdm-Type |
| • density |
| • freqBand |
| ○ startingRB |
| ○ nrofRBs |

TABLE 1-continued

| CSI-RS resource(s) configuration structure |
|---|
| ■ powerControlOffset |
| ■ powerControlOffsetSS |
| ■ scramblingID |
| ■ periodicityAndOffset |
| ■ qcl-InfoPeriodicCSI-RS |
| ○ NZP-CSI-RS-Resource 1 |
| ... |
| ○ NZP-CSI-RS-Resource N |
| ○ repetition |
| ○ aperiodicTriggeringOffset |
| ○ trs-Info |
| • NZP-CSI-RS-ResourceSet 1 |
| ... |
| • NZP-CSI-RS-ResourceSet M |

As shown in TABLE 1, the CSI-RS resource(s) may be configured by a non-zero power (NZP) CSI-RS (NZP-CSI-RS) resource configuration in UE-specific manner. As for the parameter trs-Info, if it is determined as true, the configured CSI-RS is called TRS. In some embodiments, if the parameter trs-Info in the additional resource(s) configuration for RRC idle/inactive mode is determined as true, UE will use TRS for RRM measurements; if it is determined as false, UE will use SCI-RS for RRM measurements.

A NZP-CSI-RS resource information element (LE) which is used for determining the NZP-CSI-RS resource configuration is shown in TABLE 2. A CSI-RS-ResourceMapping information element which is used to configure the resource element mapping of a CSI-RS resource in time and frequency domanin is shown in TABLE 3.

TABLE 2

| NZP-CSI-RS-Resource information element |
|---|
| -- ASN1START |
| -- TAG-NZP-CSI-RS-RESOURCE-START |
| NZP-CSI-RS-Resource ::=     SEQUENCE { |
|   nzp-CSI-RS-ResourceId     NZP-CSI-RS-ResourceId, |
|   resourceMapping           CSI-RS-ResourceMapping, |
|   powerControlOffset        INTEGER (-8..15), |
|   powerControlOffsetSS      ENUMERATED{db-3, db0, db3, db6} |
| OPTIONAL, -- Need R |
|   scramblingID              ScramblingId, |
|   periodicityAndOffset      CSI-ResourcePeriodicityAndOffset |
| OPTIONAL, -- Cond PeriodicOrSemiPersistent |
|   qcl-InfoPeriodicCSI-RS    TCI-StateId |
| OPTIONAL, -- Cond Periodic |
|   ... |
| } |

TABLE 3

| CSI-RS-ResouceMapping information element |
|---|
| -- ASN1START |
| -- TAG-CSI-RS-RESOURCEMAPPING-START |
| CSI-RS-ResourceMapping ::=     SEQUENCE { |
|   frequencyDomainAllocation    CHOICE { |
|     row1                       BIT STRING (SIZE (4)), |
|     row2                       BIT STRING (SIZE (12)), |
|     row4                       BIT STRING (SIZE (3)), |
|     other                      BIT STRING (SIZE (6)) |
|   }, |
|   nrofPorts                    ENUMERATED {p1,p2,p4,p8,p12,p16,p24,p32}, |
|   firstOFDMSymbolInTimeDomain  INTEGER (0..13), |
|   firstOFDMSymbolInTimeDomain2 INTEGER (2..12) |
| OPTIONAL, -- Need R |
|   cdm-Type                     ENUMERATED {noCDM, fd-CDM2, cdm4-FD2-TD2, cdm8-FD2-TD4}, |
|   density                      CHOICE { |
|     dot5                       ENUMERATED {evenPRBs, oddPRBs}, |

TABLE 3-continued

| CSI-RS-ResouceMapping information element | |
|---|---|
| one | NULL, |
| three | NULL, |
| spare | NULL |
| }, | |
| freqBand | CSI-FrequencyOccupation, |
| . . . | } |

Alternatively, the CSI-RS resource(s) may be configured by a CSI-RS resource mobility configuration. UE may use a full set of value(s) of parameter(s) in the CSI-RS resource(s) mobility configuration to determine the CSI-RS resource(s) for RRM measurement. TABLE 4 shows a CSI-RS-ResourceConfigMobility information element.

TABLE 4

| CSI-RS-ResourceConfigMobility information element |
|---|
| -- ASN1START |
| -- TAG-CSI-RS-RESOURCECONFIGMOBILITY-START |
| CSI-RS-ResourceConfigMobility :: =   SEQUENCE { |
|     subcarrierSpacing           SubcarrierSpacing, |
|     csi-RS-CellList-Mobility        SEQUENCE (SIZE (1. . maxNrofCSI-RS-CellsRRM) ) OF CSI-RS-CellMobility, |
|     . . ., |
|     [ [ |
|     refServCellIndex            ServCellIndex |
| OPTIONAL   -- Need S |
|     ] ] |
| } |
| CSI-RS-CellMobility ::=         SEQUENCE { |
|     cellId                PhysCellId, |
|     csi-rs-MeasurementBW          SEQUENCE { |
|         nrofPRBs              ENUMERATED { size24, size48, size96, size192, size264}, |
|         startPRB             INTEGER(0..2169) |
|     }, |
|     density               ENUMERATED {d1,d3} |
| OPTIONAL, -- Need R |
|     csi-rs-ResourceList-Mobility        SEQUENCE (SIZE (1..maxNrofCSI-RS-ResourcesRRM)) OF CSI-RS-Resource-Mobility |
| } |
| CSI-RS-Resource-Mobility ::=      SEQUENCE { |
|     csi-RS-Index             CSI-RS-Index, |
|     slotConfig              CHOICE { |
|         ms4               INTEGER (0..31), |
|         ms5               INTEGER (0..39), |
|         ms10               INTEGER (0..79), |
|         ms20               INTEGER (0..159), |
|         ms40               INTEGER (0..319) |
|     }, |
| associatedSSB              SEQUENCE { |
|     ssb-Index              SSB-Index, |
|     isQuasiColocated           BOOLEAN |
| } |
| OPTIONAL, -- Need R |
|     frequencyDomainAllocation        CHOICE { |
|         row1               BIT STRING (SIZE (4)), |
|         row2               BIT STRING (SIZE (12)) |
|     }, |
|     firstOFDMSymbolInTimeDomain       INTEGER (0. .13) , |
|     sequenceGenerationConfig         INTEGER (0..1023), |
|     . . . |
| } |
| CSI-RS-Index ::=            INTEGER (0..maxNrofCSI-RS-ResourcesRRM-1) |
| -- TAG-CSI-RS-RESOURCECONFIGMOBILITY-STOP |
| -- ASN1STOP |

When the RRC connection between UE and BS is released by BS, a transition from RRC connected mode to RRC idle/inactive mode is triggered. UE may use the second resource(s) configuration to determine the resource(s) for RRM measurement in RRC idle/inactive mode. The second resource(s) configuration is determined based on value(s) of parameter(s) in the first resource(s) configuration and/or value(s) of additional parameter(s).

In some embodiments, UE may reuse resource(s) determined by the first resource(s) configuration in RRC connected mode to perform RRC measurement(s) in RRC idle/inactive mode.

In some embodiments, UE may use resource(s) determined only by value(s) of the additional parameter(s) to perform RRC measurement(s) in RRC idle/inactive mode.

In some embodiments, UE may use resource(s) determined by value(s) of one or more parameter(s) in the first resource(s) configuration and value(s) of one or more parameter(s) in the additional parameter(s) to perform the RRM measurement in RRC idle/inactive mode. In some embodiments, value(s) of the additional parameter(s) in the second resource(s) configuration is directly determined or configured by a higher layer, for example, a RRC signaling.

In some embodiments, the additional parameter(s) may include at least one of the following: a resource ID, a reference resource ID, subcarrier spacing (SCS), cyclic prefix (CP) type, cell ID, synchronization signal and PBCH block (SSB) index, parameter(s) in the NZP-CSI RS resource(s) configuration, or parameter(s) in the CSI-RS resource(s) mobility configuration.

In some embodiments, if any one or more parameter(s) of a first parameter set is present in the additional parameters, value(s) of the one or more parameter(s) of the first parameter set in the additional parameters is determined as the value(s) of one or more parameter(s) of the first parameter set in the second resource configuration.

In some embodiments, if any one or more parameter(s) of the first parameter set is present in the additional parameters, UE will not use value(s) of the one or more parameter(s) of the first parameter set or parameter(s) associated with the one or more parameter(s) of the first parameter set in the first resource(s) configuration to determine resources for RRM measurements. In some embodiments, parameter(s) associated with the one or more parameter(s) of the first parameter set in the first resource(s) configuration may refer to the value which can determine value(s) of the one or more parameter(s) of the first parameter set.

In some embodiments, value(s) of the one or more parameter(s) of the first parameter set can be obtained by parameter(s) in the first resource(s) configuration.

In some embodiments, if any one or more parameter(s) of the first parameter set is absent in the additional parameter(s), value(s) of the one or more parameter(s) of the first parameter set or parameter(s) associated with the one or more parameter(s) of the first parameter set in the first resource(s) configuration is determined as the value(s) of the one or more parameter(s) of the first parameter set in the second resource configuration.

In some embodiments, the one or more parameter(s) of the first parameter set may include an associated SSB index, the parameter associated with the associated SSB index is transmission configuration indicator (TCI)-State ID. That is, UE may use the value of the associated SSB index to determine corresponding resource(s) for RRM measurement in RRC idle/inactive mode. It is contemplated that UE will not use the value of the TCI-State ID to determine corresponding resource(s) for RRM measurement in RRC idle/inactive mode if the associated SSB is present or included in the additional parameters, whether the TCI-State ID is present or absent.

In some embodiments, the one or more parameter(s) of the first parameter set include subcarrier spacing (SCS) and/or cyclic prefix (CP) type, the parameter associated with the SCS and CP type is bandwidth part (BWP) ID. If both SCS and CP type are present in the additional parameter(s), UE may use values of the SCS and CP type to determine corresponding resource(s) for RRM measurement in RRC idle/inactive mode and UE will not use the value of BWP ID to determine corresponding resource(s) for RRM measurement(s) in RRC idle/inactive mode, whether BWP ID is present or absent.

In some embodiments, if SCS is present in additional parameter(s) and CP type is absent in the additional parameter(s), the value of CP type is determined by the BWP ID in the first resource(s) configuration. That is, UE may determine the value of CP type by the value of BWP ID in the first resource(s) configuration. It is contemplated that UE may use the values of SCS and CP type to determine corresponding resource(s) for RRM measurement(s) in RRC idle/inactive mode.

In some embodiments, if CP type is present in additional parameter(s) and SCS is absent in the additional parameter(s), the value of SCS is determined by the BWP ID in the first resource(s) configuration. That is, UE may determine the value of SCS by the value of BWP ID in the first resource(s) configuration. It is contemplated that UE may use the values of SCS and CP type to determine corresponding resource(s) for RRM measurement(s) in RRC idle/inactive mode.

In some embodiments, if cell ID is present in the additional parameter(s), a power of resource(s) determined by the second resource(s) configuration is determined by a secondary synchronization PBCH block (SSB) power of a cell associated with the cell ID.

Referring back to FIG. 1, assuming that the coverage area 130 belongs to a serving cell and the coverage area 131 belongs to a neighbor cell, UE 122 is within the common coverage area of both the serving cell and the neighbor cell. If the cell ID is an ID of the neighbor cell, UE 122 may detect an SSB power of the neighbor cell associated with the Cell ID, and determine a power of resource(s) determined in the second resource(s) configuration in the serving cell. The power of resource(s) determined in the second resource configuration may be used for UE 122 to determine whether to switch from the serving cell to the neighbor cell.

In some embodiments, if the reference resource ID is absent in the second resource(s) configuration, a resource(s) in RRC idle/inactive mode is determined based on value(s) of parameter(s) in a CSI-RS resource(s) configuration in which a value of a resource ID equals the value of the resource ID in the second resource(s) configuration. That is, UE may use the value(s) of parameter(s) in a CSI-RS resource(s) configuration in which a value of a resource ID equals the value of the resource ID in the second resource(s) configuration to determine resource(s) for performing RRM measurement(s) in RRC idle/inactive mode.

In some embodiments, if the resource ID of an additional parameter in the second resource(s) configuration is absent, the second resource(s) configuration is determined by one or more parameter(s) in the additional parameter(s) and the resource(s) configuration having parameter(s) associated with the one or more parameter(s) in the additional parameter(s). In this case, UE may use one or more parameter(s) in the additional parameter(s) and parameter(s) in associated resources configuration to determine resource(s) for performing RRM measurement(s) in RRC idle/inactive mode.

In some embodiments, if a capability of using resources configured by the second resource(s) configuration is enabled but no second resource(s) configuration is received, the first resource(s) configuration is used to determine resources in RRC idle/inactive mode. It is contemplated that BS may not transmit the second resource(s) configuration, and thus no second resource(s) configuration is received by UE. It is contemplated that UE may use the first resource(s) configuration to determine resource(s) for performing RRM measurement(s) in RRC idle/inactive mode.

In some embodiments, if a capability of using resources in the second resource(s) configuration is enabled but receiving the second resource(s) configuration fails, the first resource(s) configuration is used to determine resources in RRC idle/inactive mode. It is contemplated that BS has transmitted the second resource(s) configuration to UE, but the second resource(s) configuration is not demodulated or decoded successfully by UE. UE may use the first resource(s) configuration to determine resource(s) for performing RRM measurement(s) in RRC idle/inactive mode.

Figure 4:
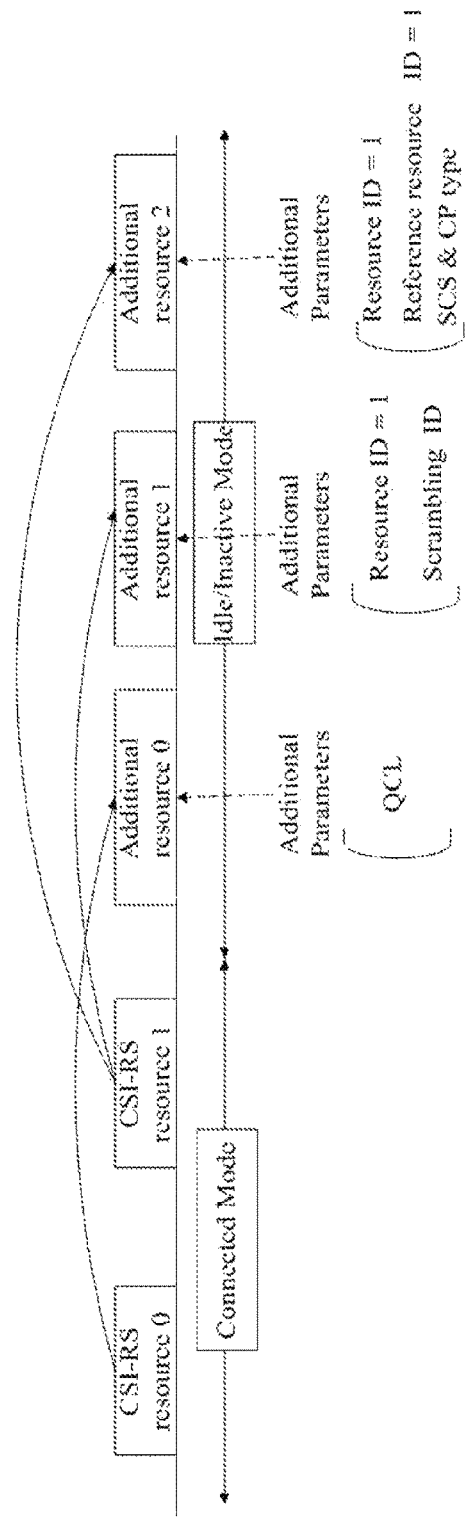
FIG. 4 illustrates an example method for determining a resource(s) configuration(s) and/or a resource(s) in RRC idle/inactive mode in accordance with some embodiments of the present application.

FIG. 4 illustrates an example method for determining a resource(s) configuration(s) and/or a resource(s) in RRC idle/inactive mode in accordance with some embodiments in present disclosure. The method in FIG. 4 may be used for resource(s) configuration in the wireless communication network 100 as shown in FIG. 1.

As shown in FIG. 4, UE receives configurations for resources CSI-RS resource 0 and CSI-RS resource 1 for RRC connected mode and configurations for additional resource 0, additional resource 1 and additional resource 2 for RRC idle/inactive mode. It is contemplated that UE may receive the above configurations via RRC signaling in RRC connected mode in accordance with some embodiments. It is contemplated that UE may receive the above configurations for additional resource 0, additional resource 1 and additional resource 2 in RRC idle/inactive mode in accordance with some embodiments. When BS releases the RRC connection, UE switches from RRC connected mode to RRC Idle/Inactive mode.

As for additional resource 0, BS transmits the configuration for CSI-RS resource 0 in RRC connected mode. BS configures Quasi Co-Location (QCL) as an additional parameter. UE receives the configuration for CSI-RS resource 0 in RRC connected mode transmitted by BS. If there exists a parameter in the configuration for CSI-RS resource 0 in RRC connected mode associated with the additional parameter QCL, UE will determine the resource(s) configuration having parameter(s) associated with the additional parameter QCL as the first configuration. UE determines the CSI-RS resource 0 by value(s) of parameter(s) in the first resource(s) configuration. UE receives and determines the additional parameter QCL and parameters in first resource(s) configuration as the second resource(s) configuration. UE uses value(s) of parameters in the second resource(s) configuration to determine the additional resource 0 for RRM measurements in RRC idle/inactive mode.

As for additional resource 1, BS transmits the configuration for CSI-RS resource 1 in RRC connected mode as value(s) of parameter(s) in the first resource(s) configuration. BS configures a Resource ID and a Scrambling ID as additional parameters, wherein resource ID is configured to equal one. UE receives the first resource(s) configuration transmitted by BS. UE determines the CSI-RS resource 1 in RRC connected mode by value(s) of parameter(s) in the first resource(s) configuraton. UE receives additional parameters Resource ID and Scrambling ID. Since Resource ID equal one, UE may determine or obtain value(s) of parameters in the resource(s) configuration having same value of Resource ID, i.e., value(s) of parameter(s) in the first resource(s) configuration for determining CSI-RS resource 1. UE may determine parameter(s) in the first configuration for determining CSI-RS resource 1 and additional parameters Resource ID and Scrambling ID as the second resource(s) configuration. UE uses the second resource(s) configuration to determine the additional resource 1 for RRM measurements in RRC idle/inactive mode.

As for additional resource 2, BS transmits the configuration for CSI-RS resource 1 in RRC connected mode as value(s) of parameter(s) in the first resource(s) configuration. BS configures a Resource ID, Reference resource ID, SCS and CP type as additional parameters, wherein resource ID and Reference resource ID are configured to equal one. UE receives the first resource(s) configuration transmitted by BS. UE determines CSI-RS resource 1 in RRC connected mode by value(s) of parameter(s) in the first resource(s) configuration. UE receives additional resources Resource ID, Reference resource ID, SCS and CP type, wherein resource ID equals one and Reference resource ID equals one. UE may determine or obtain values of parameters in the resource(s) configuration having same value of Resource ID, i.e., value(s) of parameters in the first resource(s) configuration for determining CSI-RS resource 1. UE may determine parameter(s) in the first configuration for determining CSI-RS resource 1 and additional parameters Resource ID, Reference resource ID, SCS and CP type as the second resource(s) configuration. UE uses the second resource(s) configuration to determine the additional resource 2 for RRM measurements in RRC idle/inactive mode.

Figure 5:
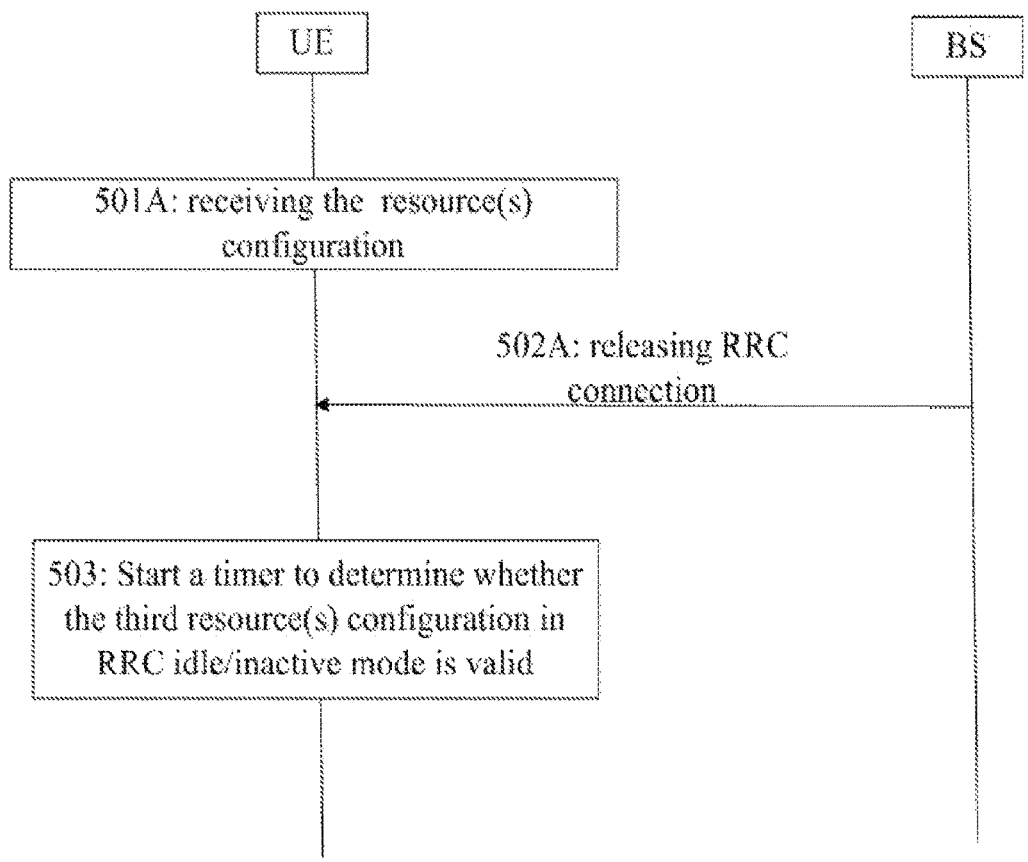
FIG. 5 illustrates a method for determining a resource(s) configuration(s) and/or a resource(s) in RRC idle/inactive mode in accordance with some embodiments of the present application.

FIG. 5 illustrates a method for determining a resource(s) configuration(s) and/or a resource(s) in RRC idle/inactive mode in accordance with some embodiments of the present disclosure. The method in FIG. 5 may be used for determining a resource(s) configuration(s) and/or a resource(s) in RRC idle/inactive mode in the wireless communication network 100 as shown in FIG. 1.

Referring to FIG. 5, in operation 501, UE receives a resource configuration to determine the resource(s). It is contemplated that the resource(s) configuration may be a first resource(s) configuration as stated above. It is contemplated that the resource(s) configuration may be a second resource configuration as stated above. The second resource(s) configuration may be determined based on value(s) of parameter(s) in a CSI-RS resource(s) configuration in RRC connected mode and/or value(s) of additional parameter(s). It is contemplated that the resource configuration can be a third resource configuration. It is contemplated that the third resource configuration may be a second resource(s) configuration. It is contemplated that the third resource(s) configuration may be an update of the second resource(s) configuration.

In operation 502, the RRC connection is released in UE. UE switches from RRC connected mode to RRC idle/inactive mode when the RRC connection is released.

Referring to FIG. 5, UE receives the resource(s) configuration in operation 501 before RRC connection is released by BS in operation 502.

In some embodiments, UE may receive the resource(s) configuration in RRC idle/inactive mode.

In operation 503, UE starts a timer to determine whether the third resource(s) configuration in RRC idle/inactive mode is valid.

In some embodiments, UE will determine the third resource(s) configuration to be invalid if the time expires.

In some embodiments, if the timer expires and a DCI is not received, UE falls back to perform SSB-based measurement. That the DCI is not received means that BS does not transmit the DCI to UE. It is contemplated that the DCI is not received means that BS transmits the DCI to UE, but the DCI is not successfully decoded or demodulated by UE. In some embodiments, the DCI may be DCI format 1_0 scrambled by P_RNTI.

Figure 6:
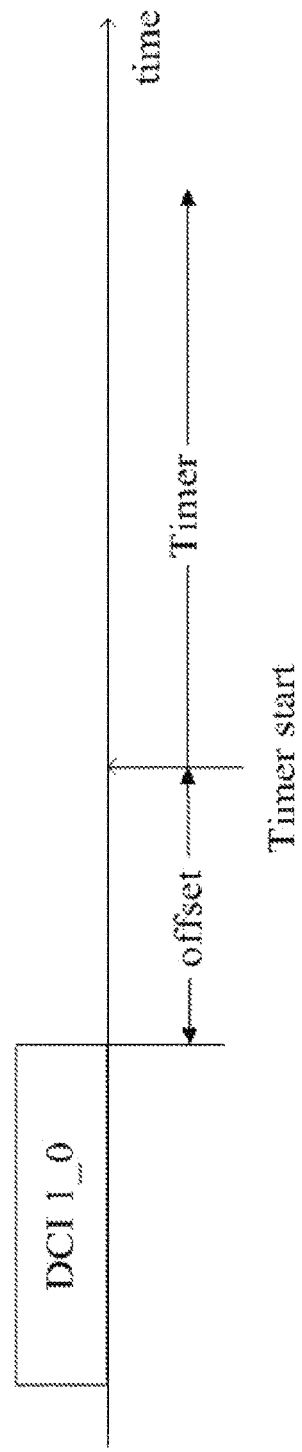
FIG. 6 illustrates an operation mechanism of the timer in accordance with some embodiments of the present application.

In some embodiments, if the timer expires and a DCI is received successfully, restarting the timer after an offset of the DCI. The offset is configured by higher layer or indicated by the DCI. FIG. 6 illustrates an example operation mechanism of the timer.

In some embodiments, the DCI may include information indicating using a previous resource(s) in a previous configuration. UE may use the previous resource(s) to perform RRM measurement in RRC idle/inactive mode. The previous resource(s) may be determined by a previous resource(s) configuration. The previous resource(s) configuration may be the second resource(s) configuration if UE receives the third resource(s) configuration in some embodiments. It is contemplated that the DCI may be received successfully when or after the time expires in accordance with some embodiments. It is contemplated that the DCI may be received successfully when the timer does not expire in accordance with some embodiments.

In some embodiments, the DCI may include information activating a new resource(s). UE may use the new resource(s) to determine resource(s) for performing RRM measurements in RRC idle/inactive mode. It is contemplated that the new resource(s) may be determined by a previous resource(s) configuration. The previous resource(s) configuration may be the second resource(s) configuration in some embodiments. It is contemplated that the new resource(s) may be determined by a new resource(s) configuration.

Figure 7:
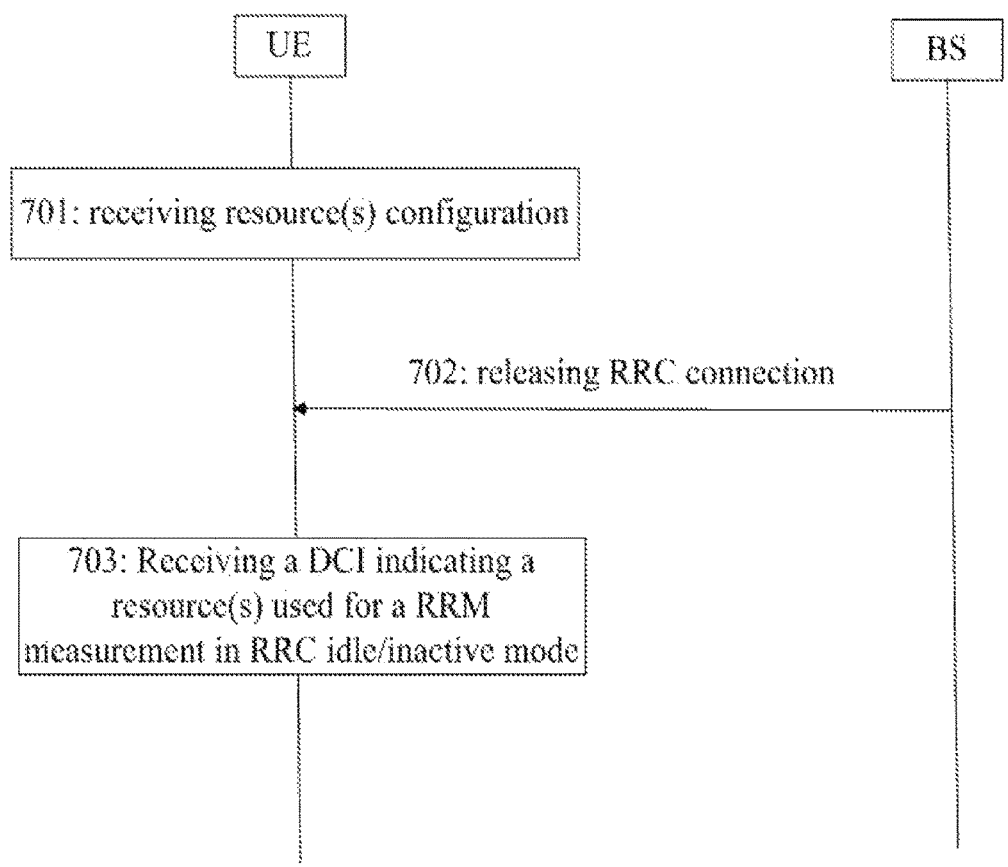
FIG. 7 illustrate a method for determining a resource(s) configuration(s) and/or a resource(s) in RRC idle/inactive mode in accordance with some other embodiments of the present application.

FIG. 7 illustrates a method determining a resource(s) configuration(s) and/or a resource(s) in RRC idle/inactive mode in accordance with some embodiments of the present disclosure. The method in FIG. 7 may be used for determining a resource(s) configuration(s) and/or a resource(s) in RRC idle/inactive mode in the wireless communication network 100 as shown in FIG. 1.

Referring to FIG. 7, in operation 701, UE receives a resource configuration to determine the resource(s). It is contemplated that the resource(s) configuration may be a first resource(s) configuration as stated above in accordance with some embodiments of the present disclosure. It is contemplated that the resource(s) configuration may be a second resource configuration as stated above in accordance with some embodiments of the present disclosure. The second resource(s) configuration may be determined based on value(s) of parameter(s) in a CSI-RS resource(s) configuration in RRC connected mode and/or value(s) of additional parameter(s). It is contemplated that the resource configuration can be a third resource configuration as stated above in accordance with some embodiments of the present disclosure. The third resource configuration may be a second resource(s) configuration. It is contemplated that the third resource(s) configuration may be an update of the second resource(s) configuration.

In operation 702, BS releases the RRC connection with UE. UE switches from RRC connected mode to RRC idle/inactive mode.

Referring to FIG. 7, UE receives the resource(s) configuration in operation 701 before RRC connection is released by BS in operation 702.

In some embodiments, UE may receive the resource(s) configuration in RRC idle/inactive mode.

In operation 703, UE receives a DCI indicating a resource(s) for use in RRC idle/inactive mode. In some embodiments, the DCI may be DCI format 1_0 scrambled by P_RNTI. In some embodiments, UE will switch to RRC connected mode to receive a new resource(s) configuration according to the DCI, wherein the new resource(s) configuration is a resource configuration determined after a determination of the second resource(s) configuration. In some embodiments, UE will fall back to perform SSB-based RRM measurement according to the DCI. In some embodiments, UE will perform the RRM measurement via a previous resource(s) according to the DCI. In some embodiments, UE will use a new resource(s) activated by the DCI.

In some embodiments, one or more bits in the DCI format 1_0 scrambled by P_RNTI may be used for indicating UE to perform RRM measurements in RRC idle/inactive mode.

In some embodiments, one bit may be configured by BS in the DCI format 1_0 scrambled with P_RNTI. TABLE 5 shows a one-bit CSI-RS indicator in DCI format 1_0. If the value of this bit is determined as "1", UE may switch from RRC idle/inactive mode to RRC connected mode to receive a new resource(s) configuration. The new resource(s) configuration is a resource configuration determined after a determination of the second resource(s) configuration. If the value of this bit is determined as "0", UE may fall back to perform SSB-based measurement or use previous configuration.

TABLE 5

One-bit CSI-RS indicator in DCI format 1_0

| Bit field | RRM measurement resource indicator |
| --- | --- |
| 1 | Enter connected mode to receive new configuration |
| 0 | Fallback to SSB-based measurement or use previous configuration |

In some embodiments, two bits may be configured by BS in the DCI format 1_0 scrambled with P_RNTI. TABLE 6 shows a two-bit CSI-RS indicator in DCI format 1_0. If the value of the two bits is determined as "11", UE may switch from RRC idle/inactive mode to RRC connected mode to receive a new resource(s) configuration. The new resource(s) configuration is a resource configuration determined after a determination of the second resource(s) configuration. If the value of th two bits is determined as "10", UE may fall back to perform SSB-based measurement. If the value of the two bits is determined as "01", UE may use previous configuration to determine resource(s) for performing RRM measurements in RRC idle/inactive mode. In some embodiments, the value "00" of the two bits may be served or set as null.

TABLE 6

Two-bit CSI-RS indicator in DCI format 1_0

| Bit field | RRM measurement resource indicator |
| --- | --- |
| 11 | Enter connected mode to receive new configuration |
| 10 | Fallback to SSB-based measurement |
| 01 | Use previous configuration |
| 00 | Reserved |

In some embodiments, UE may use a value determined in the DCI format 1_0 scrambled with P_RNTI to activate a new resource(s) determined in a previous configuration. In some embodiments, UE may use a value determined in the DCI format 1_0 scrambled with P_RNTI to activate a new resource(s) determined in a newer resource(s) configuration.

TABLE 7 shows a DCI format 1_0 with CRC scrambled by P_RNTI.

TABLE 7

DCI format 1_0 with CRC scrambled by P_RNTI

| Field (Item) | Bits |
|---|---|
| Short Message Indicator | 2 |
| Short Messages | 8 |
| Frequency domain resource assignment | Variable |
| Time domain resource assignment | 4 |
| VRB-to-PRB mapping | 1 |
| Modulation and coding scheme | 5 |
| TB Scaling | 2 |
| Reserved | 6 |

In TABLE 7, the reserved six bits in DCI may be applicable to indicates update for potential TRS/CSI-RS occasions to UEs in RRC idle/inactive mode.

TABLE 8 shows the short message indicator.

TABLE 8 the short message indicator

| Bit | Short Message |
|---|---|
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3 | stopPagingMonitoring<br>If set to 1: stop monitoring PDCCH occasions(s) for paging in this PO. |
| 4-8 | Not used in this release of the specification, and shall be ignored by UE if received. |

In TABLE 8, five bits in DCI may be applicable to indicate update for potential TRS/CSI-RS occasions to UEs in RRC idle/inactive mode.

Figure 8:
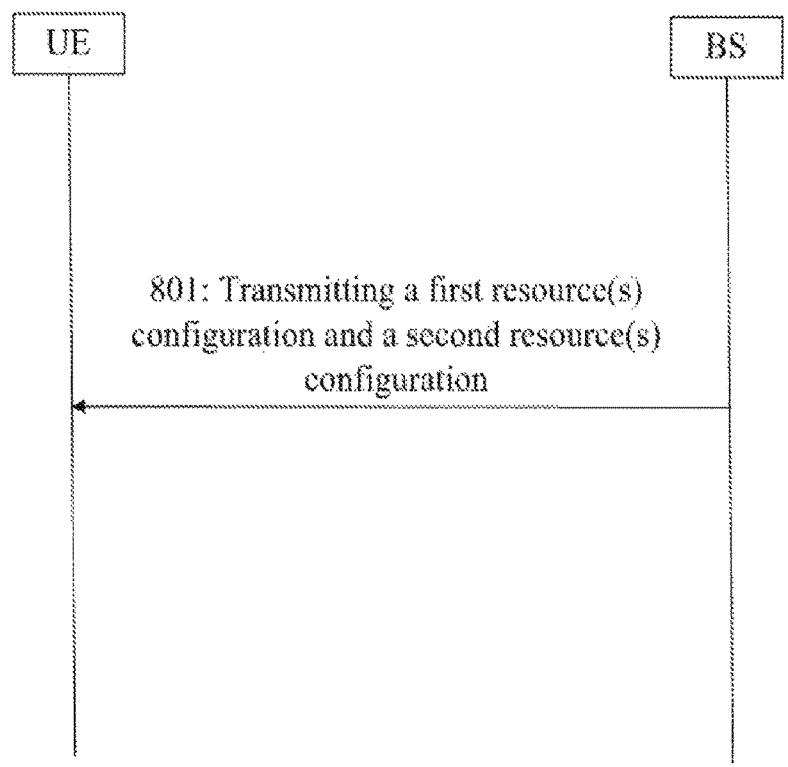
FIG. 8 illustrates a method for determining a resource(s) configuration(s) and/or a resource(s) in RRC idle/inactive mode in accordance with some other embodiments of the present application.

FIG. 8 illustrates a method for determining a resource(s) configuration(s) and/or a resource(s) in RRC idle/inactive mode in accordance with some embodiments of the present disclosure. The method in FIG. 8 may be used for determining a resource(s) configuration(s) and/or a resource(s) in RRC idle/inactive mode in the wireless communication network 100 as shown in FIG. 1.

As shown in FIG. 8, in operation 801, BS transmits a first resource(s) configuration and a second resource(s) configuration.

In some embodiments, the second resource(s) configuration is used for UE to determine a resource(s) in RRC idle/inactive mode. In some embodiments, the second resource(s) configuration is determined based on value(s) of parameter(s) in the first resource(s) configuration and/or value(s) of additional parameter(s). In some embodiments, the first resource(s) configuration is determined for UE to determine a CSI-RS resource(s) in a RRC connected mode. As for the determination of the first resource(s) configuration and the second resource(s) configuration, other descriptions in the present disclosure may also be applicable to BS side.

Figure 9:
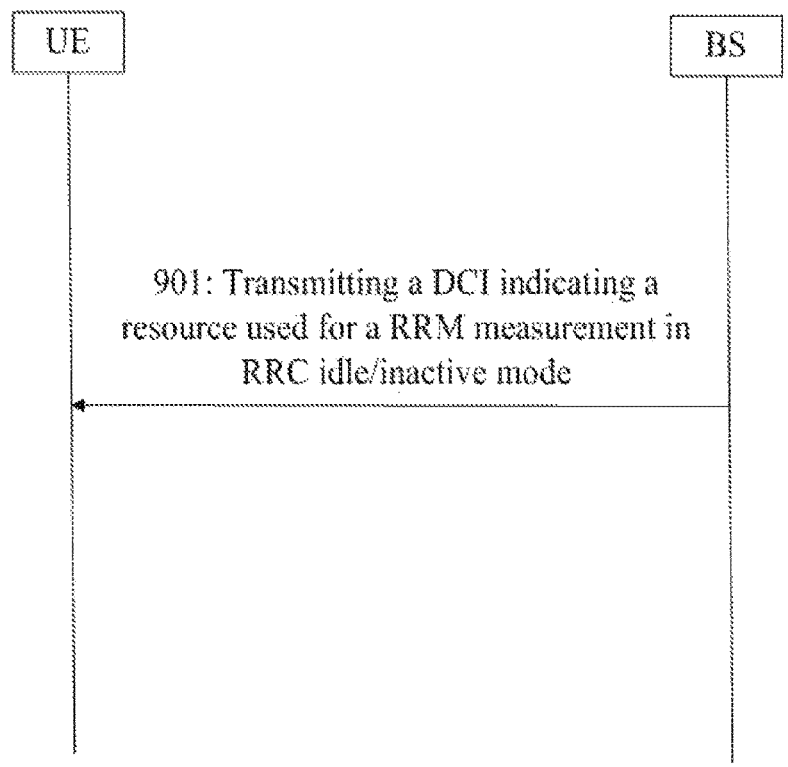
FIG. 9 illustrates a method for determining a resource(s) configuration(s) and/or a resource(s) in RRC idle/inactive mode in accordance with some other embodiments of the present application.

FIG. 9 illustrates a method for determining a resource(s) configuration(s) and/or a resource(s) in RRC idle/inactive mode in accordance with some embodiments of the present disclosure. The method in FIG. 9 may be used for determining a resource(s) configuration(s) and/or a resource(s) in RRC idle/inactive mode in the wireless communication network 100 as shown in FIG. 1.

As is shown in FIG. 9, in operation 1001, BS transmits a DCI indicating a resource(s) used for a RRM measurement in RRC idle/inactive mode. In some embodiments, the DCI may be DCI format 1_0 scrambled by P_RNTI.

In some embodiments, before transmitting the DCI, BS may transmit a second resource(s) configuration to UE. UE will determine the second resource(s) configuration based on value(s) of parameter(s) in a first CSI-RS resource(s) configuration for determining a resource(s) in RRC connected mode and/or value(s) of additional parameter(s). As for the instruction or information in DCI configured by BS, other description in the present disclosure may also be applicable to BS side.

Figure 10:
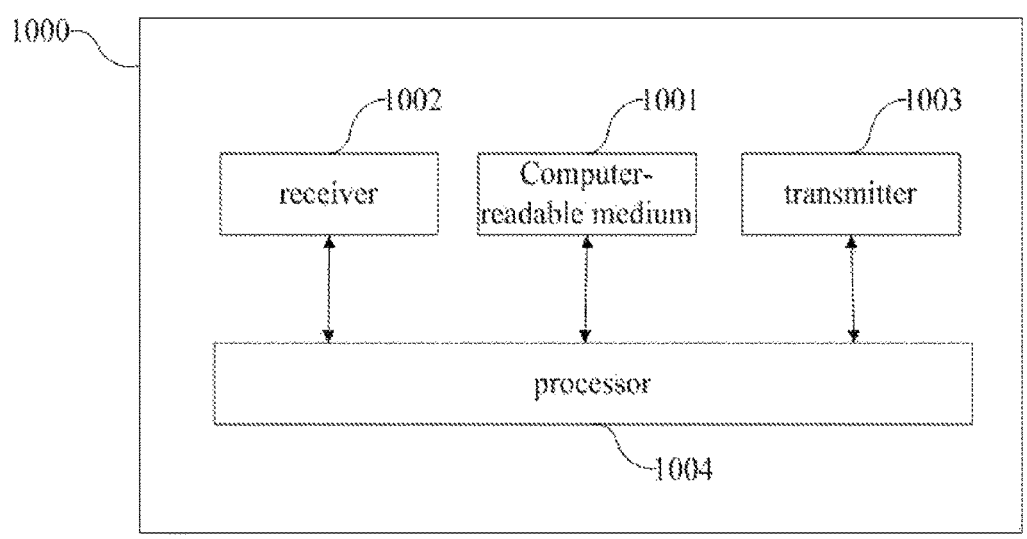
FIG. 10 illustrates an apparatus for determining a resource(s) configuration(s) and/or a resource(s) in RRC idle/inactive mode in accordance with some embodiments of the present application.

FIG. 10 illustrates an apparatus for determining a resource(s) configuration(s) and/or a resource(s) in RRC idle/inactive mode in accordance with some embodiments of the present disclosure. The apparatus in FIG. 10 may be used for determining a resource(s) configuration(s) and/or a resource(s) in RRC idle/inactive mode in the wireless communication network 100 as shown in FIG. 1.

As shown in FIG. 10, the apparatus 1000 may include a non-transitory computer-readable medium 1001. The apparatus 1000 may further include a receiver 1001. The apparatus 1000 may further include a transmitter 1003. The apparatus 1000 may further include a processer 1004. The non-transitory computer-readable medium 1001 has computer executable instructions stored therein. The processor 1004 is configured to be coupled to the non-transitory computer readable medium 1001. The processor 1004 is configured to be coupled to the receiver 1002. The processor 1004 is configured to be coupled to the transmitter 1003. It is contemplated that the apparatus 1000 may include more computer-readable mediums, receiver, transmitter and processors in some other embodiments of the present application according to practical requirements. In some embodiments, the apparatus 1000 may be a UE. UE may include, for example but is not limited to, a computing device, a wearable device, a mobile device, an IoT device, a vehicle having at least a transceiver, etc. In some embodiments, the apparatus 1000 may be a BS. BS may operate, for example but is not limited to, based on the standard protocol of LTE, LTE-A, NR, WiMAX, WiFi or other suitable protocol(s). In some embodiments, the receiver 1002 and the transmitter 1003 are integrated into a single device, such as a transceiver. In certain embodiments, the apparatus 1000 may further include an input device, a memory, and/or other components.

In some embodiments, the non-transitory computer-readable medium may have stored thereon computer-executable instructions to cause a processor to implement the method with respect to UE (e.g., UE 120, UE 122 and UE 123) which be assumed to function as describe above. For example, the non-transitory computer-readable medium 1001 and the computer executable instructions are configured, with the processor 1004, cause the apparatus 1000 to perform the operations with respect to the UE depicted in present disclosure.

In some embodiments, the non-transitory computer-readable medium may have stored thereon computer-executable instructions to cause a processor to implement the method with respect to BS (e.g., BS 110 and BS 111) as describe above. For example, the non-transitory computer-readable medium 1001 and the computer executable instructions are configured, with the processor 1004, cause the apparatus 1000 to perform the operations with respect to the BS depicted in present disclosure.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

The following is what is claimed:

1. A method performed by a user equipment (UE), the method comprising:
   receiving a first resource configuration for one or more first resources;
   receiving a second resource configuration for one or more second resources, wherein the second resource configuration comprises a cell identifier (ID), and wherein a power associated with the one or more second resources is based at least in part on a synchronization signal block (SSB) power of a cell corresponding to the cell ID; and
   determining one or more resources for a radio resource control (RRC) idle mode or an RRC inactive mode, wherein the second resource configuration is determined based at least in part on one or more of the first resource configuration or the second resource configuration.

2. The method of claim 1, further comprising determining, using the first resource configuration, a channel state information reference signal (CSI-RS) resource in an RRC connected mode.

3. The method of claim 1, wherein the second resource configuration comprises at least one of a resource ID, a reference resource ID, subcarrier spacing (SCS), a cyclic prefix (CP) type, a synchronization signal and physical broadcast channel index, parameters in a non-zero power channel state information reference signal (NZP-CSI-RS) resource configuration, or parameters in a CSI-RS resource mobility configuration.

4. The method of claim 3, wherein the reference resource ID is absent from the second resource configuration, and wherein the one or more resources for the RRC idle mode or the RRC inactive mode is determined based at least in part on a CSI-RS resource configuration comprising a same value of the resource ID as the second resource configuration.

5. The method of claim 1, wherein the one or more resources for the RRC idle mode or the RRC inactive mode are determined using the first resource configuration based at least in part on a capability of using the one or more second resources configured by the second resource configuration being enabled and the second resource configuration not being received.

6. A user equipment (UE) for wireless communication, comprising:
   at least one memory; and
   at least one processor coupled with the at least one memory and operable to cause the UE to:
      receive a first resource configuration for one or more first resources;
      receive a second resource configuration for one or more second resources, wherein the second resource configuration comprises a cell identifier (ID), and wherein a power associated with the one or more second resources is based at least in part on a synchronization signal block (SSB) power of a cell corresponding to the cell ID; and
      determine one or more resources for a radio resource control (RRC) idle mode or an RRC inactive mode, wherein the second resource configuration is determined based at least in part on one or more of the first resource configuration or the second resource configuration.

7. The UE of claim 6, wherein the at least one processor is further operable to cause the UE to determine, using the first resource configuration, one or more channel state information reference signal (CSI-RS) resources in an RRC connected mode.

8. The UE of claim 6, wherein the second resource configuration comprises at least one of a resource ID, a reference resource ID, subcarrier spacing (SCS), a cyclic prefix (CP) type, a synchronization signal physical broadcast channel index, parameters in a non-zero power channel state information reference signal (NZP-CSI-RS) resource configuration, or parameters in a CSI-RS resource mobility configuration.

9. The UE of claim 8, wherein the reference resource ID is absent from the second resource configuration, and wherein the one or more resources for the RRC idle mode or the RRC inactive mode is determined based at least in part on a CSI-RS resource configuration comprising a same value of the resource ID as the second resource configuration.

10. The UE of claim 6, wherein the at least one processor is further operable to cause the UE to:
    start a timer based at least in part on switching to the RRC idle mode or the RRC inactive mode; and
    determine, based at least in part on the timer, whether a third resource configuration for the RRC idle mode or the RRC inactive mode is valid.

11. The UE of claim 10, wherein the third resource configuration is determined to be invalid based at least in part on expiry of the timer.

12. The UE of claim 11, wherein the at least one processor is further operable to cause the UE to:
    fallback to perform SSB-based measurement based at least in part on the expiry of the timer and based at least in part on failing to receive a downlink control information (DCI); or
    restart the timer after an offset of the DCI based at least in part on the expiry of the timer and based at least in part on successfully receiving the DCI.

13. The UE of claim 6, wherein the at least one processor is further operable to cause the UE to receive a downlink control information (DCI) indicating the one or more resources, wherein the one or more resources are used for a radio resource management (RRM) measurement in the RRC idle mode or the RRC inactive mode.

14. A network equipment (NE) for wireless communication, comprising:
    at least one memory; and
    at least one processor coupled with the at least one memory and operable to cause the NE to:
        transmit a first resource configuration for one or more first resources; and
        transmit a second resource configuration for one or more second resources, wherein the second resource configuration comprises a cell identifier (ID), wherein a power associated with the one or more second resources is based at least in part on a synchronization signal block (SSB) power of a cell corresponding to the cell ID, and wherein one or more resources for a radio resource control (RRC) idle mode or an RRC inactive mode are based at least in part on the first resource configuration or the second resource configuration.

15. The NE of claim 14, wherein a channel state information reference signal (CSI-RS) resource in an RRC connected mode is based at least in part on the first resource configuration.

16. The NE of claim 14, wherein the second resource configuration comprises at least one of a resource ID, a reference resource ID, subcarrier spacing (SCS), a cyclic prefix (CP) type, a synchronization signal and physical broadcast channel block index, parameters in a non-zero power channel state information reference signal (NZP-CSI-RS) resource configuration, or parameters in a CSI-RS resource mobility configuration.

17. The NE of claim 16, wherein the reference resource ID is absent from the second resource configuration, and wherein the one or more resources for the RRC idle mode or the RRC inactive mode are based at least in part on a CSI-RS resource configuration comprising a same value of the resource ID as the second resource configuration.

18. The NE of claim 17, wherein a third resource configuration for the RRC idle mode or the RRC inactive mode is valid based at least in part on a timer.

19. The NE of claim 17, wherein the at least one processor is further operable to cause the NE to transmit a downlink control information (DCI) indicating the one or more resources, wherein the one or more resources are associated with a radio resource management (RRM) measurement in the RRC idle mode or the RRC inactive mode.

20. A method performed by a network equipment (NE), the method comprising:
    transmitting a first resource configuration for one or more first resources; and
    transmitting a second resource configuration for one or more second resources, wherein the second resource configuration comprises a cell identifier (ID), wherein a power associated with the one or more second resources is based at least in part on a synchronization signal block (SSB) power of a cell corresponding to the cell ID, and wherein one or more resources for a radio resource control (RRC) idle mode or an RRC inactive mode are based at least in part on the first resource configuration or the second resource configuration.

* * * * *